United States Patent
Dennis et al.

(10) Patent No.: US 6,285,802 B1
(45) Date of Patent: Sep. 4, 2001

(54) ROTATIONAL CORRECTION AND DUPLICATE IMAGE IDENTIFICATION BY FOURIER TRANSFORM CORRELATION

(75) Inventors: Phillip W. Dennis, Thousand Oaks; Stuart A. Mills, West Hills; Robert B. Dydyk, Newbury Park, all of CA (US)

(73) Assignee: Litton Systems, Inc., Agoura Hills, CA (US)

( * ) Notice: Subject to any disclaimer, the term of this patent is extended or adjusted under 35 U.S.C. 154(b) by 0 days.

(21) Appl. No.: 09/289,082

(22) Filed: Apr. 8, 1999

(51) Int. Cl.[7] .................................................. G06F 15/332
(52) U.S. Cl. ........................ 382/280; 382/290; 382/296
(58) Field of Search ................................. 382/280, 278, 382/289, 260, 290, 291, 292, 293, 294, 295, 296, 321; 356/399, 400; 358/497, 488

(56) References Cited

U.S. PATENT DOCUMENTS

| | | | |
|---|---|---|---|
| 3,599,147 | 8/1971 | Rogers et al. | 340/146.3 |
| 3,993,976 | 11/1976 | Ginsburg | 340/146.3 |
| 4,338,588 | 7/1982 | Chevillat et al. | 340/146.3 |
| 4,513,441 | 4/1985 | Henshaw | 382/43 |
| 4,539,651 | 9/1985 | Ludman | 364/822 |
| 4,558,461 | 12/1985 | Schlang | 382/9 |
| 4,635,278 * | 1/1987 | Maloon et al. | 375/45 |
| 4,723,297 | 2/1988 | Posti | 382/46 |
| 4,764,973 | 8/1988 | O'Hair | 382/14 |
| 4,817,176 | 3/1989 | Marshall et al. | 382/43 |
| 4,843,631 | 6/1989 | Steinpichler et al. | 382/43 |
| 4,892,408 * | 1/1990 | Pernick et al. | 356/400 |
| 5,001,766 | 3/1991 | Baird | 382/46 |
| 5,061,063 | 10/1991 | Casasent | 356/71 |
| 5,148,496 | 9/1992 | Anderson | 382/42 |
| 5,175,775 | 12/1992 | Iwaki et al. | 382/31 |
| 5,216,541 | 6/1993 | Takesue et al. | 359/561 |
| 5,235,651 | 8/1993 | Nafarieh | 382/46 |
| 5,239,595 | 8/1993 | Takemura et al. | 382/31 |
| 5,311,359 | 5/1994 | Lucas et al. | 359/561 |
| 5,355,420 | 10/1994 | Bloomberg et al. | 382/46 |
| 5,420,441 * | 5/1995 | Newman et al. | 250/581 |
| 5,513,304 * | 4/1996 | Spitz et al. | 395/144 |
| 5,528,702 | 6/1996 | Mitsuoka et al. | 382/211 |
| 5,530,772 | 6/1996 | Storey | 382/135 |
| 5,583,956 | 12/1996 | Aghajan et al. | 382/290 |
| 5,619,596 | 4/1997 | Iwaki et al. | 382/278 |
| 5,668,898 | 9/1997 | Tatsuta | 382/290 |
| 5,764,383 * | 6/1998 | Saund et al. | 358/497 |
| 5,841,907 | 11/1998 | Javidi et al. | 382/210 |

OTHER PUBLICATIONS

Russ, The Image Processing Handbook, CRC Press, Inc., pp. 218–222, (1992).

* cited by examiner

Primary Examiner—Leo Boudreau
Assistant Examiner—Kanji Patel
(74) Attorney, Agent, or Firm—Koppel & Jacobs

(57) ABSTRACT

The invention corrects for rotational misalignment of images having a prominent periodic structure in a preferred direction, particularly imaged text pages. It preferably also finds the degree of correlation between different images. First the rotational misalignment of an imaged page is detected and corrected, bringing the page into alignment with an axis. The angle of rotation of the page is detected by performing a linear regression analysis on filtered, two-dimensional power spectral density distribution of the page, to find the angular orientation of the periodic components. In the preferred embodiment, two imaged pages are then cross-correlated, preferably by an optical correlator, to find the degree of correlation between the pages.

13 Claims, 8 Drawing Sheets

ROTATIONAL CORRECTION AND DUPLICATE IMAGE IDENTIFICATION BY FOURIER TRANSFORM CORRELATION

BACKGROUND OF THE INVENTION

1. Field of the Invention

This invention relates to image processing generally and more specifically to text recognition by Fourier transform correlation of imaged multi-line, paged text.

2. Description of the Related Art

Recognition of text in an imaged text database is required for multiple purposes. It is often required to locate a text page in a larger textual database or "book"; or it is sometimes useful to identify duplicate pages which can be deleted, to compress a database without loss of information.

Such a search is relatively easy in the context of encoded information, where characters and words are encoded as a sequence of digital bytes. However, imaged pages, in which the text pages are bitmaps or other graphic representations, are not so easily compared by a computer.

One method of comparing graphic images is cross-correlation, which is usually performed by first two-dimensionally Fourier transforming the images to be compared, then multiplying the pixels point by point, and finally inversely transforming the images back into a spatial representation to show correlation peaks. This well known method has been discussed, for example, in John C. Russ, *The Image Processing Handbook*, (CRC Press, 1992), pages 218–221. Advantages in speed are potentially obtained by performing such correlations optically, by an optical correlator. See for example, U.S. Pat. No. 5,311,359 to Lucas et al., and U.S. Pat. No. 5,148,496 to Anderson. Both of these patents disclose compact optical correlators capable of performing cross-correlation of digitized, pixellated images.

While correlation of images performs well with rotationally aligned images, pages of text are typically not well aligned rotationally. Text pages are usually digitized by feeding them through a digitizing "scanner", or by imaging them through a digital camera or similar device. Imprecision in feeding and scanning hardware produces varying rotational misalignments in the digitized images. The resulting images are rotated ("skewed") with respect to horizontal and vertical axes. Two otherwise duplicate images which differ by a slight rotation will not produce a strong correlation when compared. This degradation of correlation with skew angle is so pronounced that a misalignment in the range of only 1–2 degrees will significantly degrade correlation. Therefore, a method of rotationally correcting scanned text is a prerequisite to identification of scanned text by correlation.

One method of rotationally correcting text is disclosed in U.S. Pat. No. 5,235,651 to Nafarieh (1993). This method operates in the context of an optical character recognition ("OCR") system, and limited in its ability to correct for rotational error. Specifically, the patented system only detects and corrects for inversion of the page, or rotation by 90 degrees (a sideways page). While these corrections may be useful in an OCR system, they are not adequate to allow rapid identification of duplicate imaged pages, which might have errors in rotation of (for example) five degrees or less.

Another method of rotationally correcting images is disclosed by Postl in his U.S. Pat. No. 4,723,297 (1988). His method involves scanning the image repeatedly at varying search angles, optimizing "directional criteria", and then rotating the image based on the optimized directional criteria. The disclosed method only rotationally corrects skew in images during acquisition; it does not identify duplicate images. It requires many iterations to optimize, is computationally complex, and requires the predetermination of the "directional criteria." Various other methods have been developed for detecting rotational or "skew" angle in text, but they have generally been mathematically very complex or computationally demanding. Efforts at improvement have focused on reducing the computational demands of the method. See for example, U.S. Pat. No. 5,583,956 to Aghajan, et al., disclosing a method using a subspace-based line detection algorithm, and the other methods cited therein.

SUMMARY OF THE INVENTION

The invention is a method for correcting for rotational misalignment of images and, in the preferred embodiment, for finding the degree of correlation between pages (or portions thereof) of images having a prominent periodic structure (such as multi-line text). The method includes two major steps.

In the first step the rotational misalignments of the pages are detected and corrected, bringing the pages into alignment with vertical and horizontal axes. The angles of rotation of the pages are detected by performing a linear regression analysis of filtered, two-dimensional Fourier transform images of the text pages, to find the angular orientation of the strongest periodic components of the text. The preferred embodiment includes a second step, in which two imaged pages are cross-correlated, preferably by an optical correlator, to find the degree of correlation between the pages.

The method can be reiterated for multiple pages of text, thereby comparing a page with each of the other pages to find duplicate pages of text.

DETAILED DESCRIPTION OF THE INVENTION

The invention is a method and apparatus for rotationally aligning skewed pages and preferably also for rapidly determining a degree of similarity between pages with a strong periodic structure (especially pages of text). It can be used, for example, to quickly identify duplicate pages (or portions thereof) in an imaged database, either to locate information or so that the duplicated pages can be removed from the database. In some applications the rotationally aligned text might be stored or output as a useful product, for later searching or viewing by a user.

The invention typically operates on imaged pages, preferably having multiple lines of text. It should be understood that an imaged text page is a bitmap or picture or the page, consisting of stored data representing the pages as pixels in a scanned matrix, not as a sequence of encoded characters as in ASCII text. The pages may be digitized by scanning, by a digital camera, or by computer graphic generation, for example.

The pages selected for comparison by the invention should be digitized with sufficiently high resolution to permit correlation. It has been found that an image matrix as coarse as 256×256 pixels (per page) is sufficient to yield strong correlation results for duplicate pages; this is remarkable since pages rendered at such low resolution are illegible (for humans). The invention will produce more definite correlations with an image resolution of 512×512, but at reduced speed. The ability to recognize duplicate pages rendered with very low resolution is a distinct advantage of the invention, not only because high resolution may be unavailable but because the use of low resolution images allows image processing at higher speeds. If high resolution page images are available, they may optionally be reduced to low resolution before processing (by pixel averaging or other well known methods) to increase processing speed, while retaining the corresponding high resolution images in a database for later use.

Figure 1:
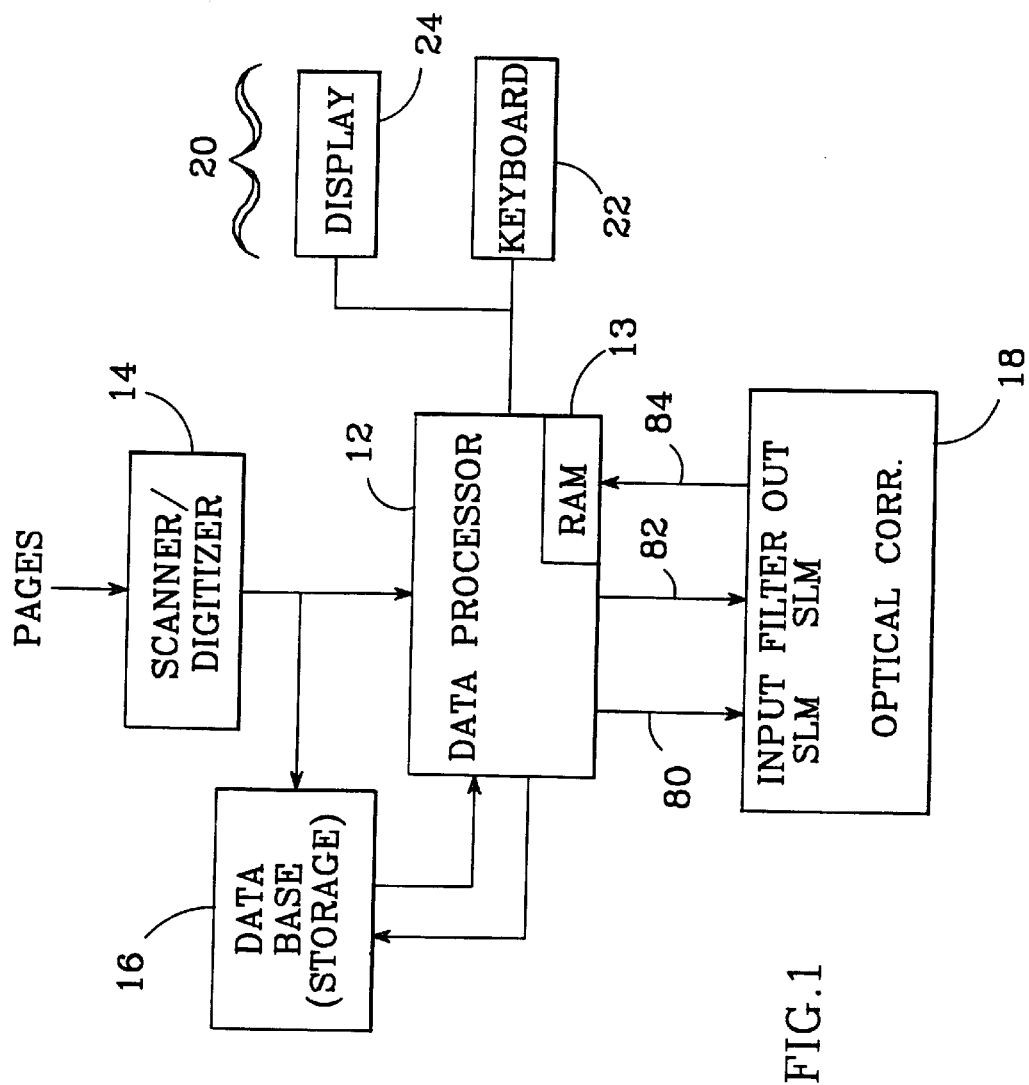
FIG. 1 is a block diagram of the apparatus of the invention.

The apparatus preferred for practicing the invention, as shown in FIG. 1, includes a programmable data processor (with included random access memory or "RAM" 13), a scanner 14, an image storage database 16, an optical correlator 18, and a user interface 20—for example, a keyboard 22 and a video display 24 interfaced to the data processor 12 so that the user can control the operation of the system. The scanner 14 digitizes text for input into the image storage database 16, where the digitized images ("pages") are accessible to the data processor 12. The data processor manipulates the pages according to the method described below, preferably with the aid of the optical correlator 18, which is included in the preferred embodiment. The optical correlator 18, under control of the data processor 12 receives dual images (an "input" and a "filter" image) from the data processor 12 through image input channels, optically performs rapid image correlations and outputs to the data processor 12 a cross-correlation image which is a cross-correlation of the input and filter images.

Figure 2:
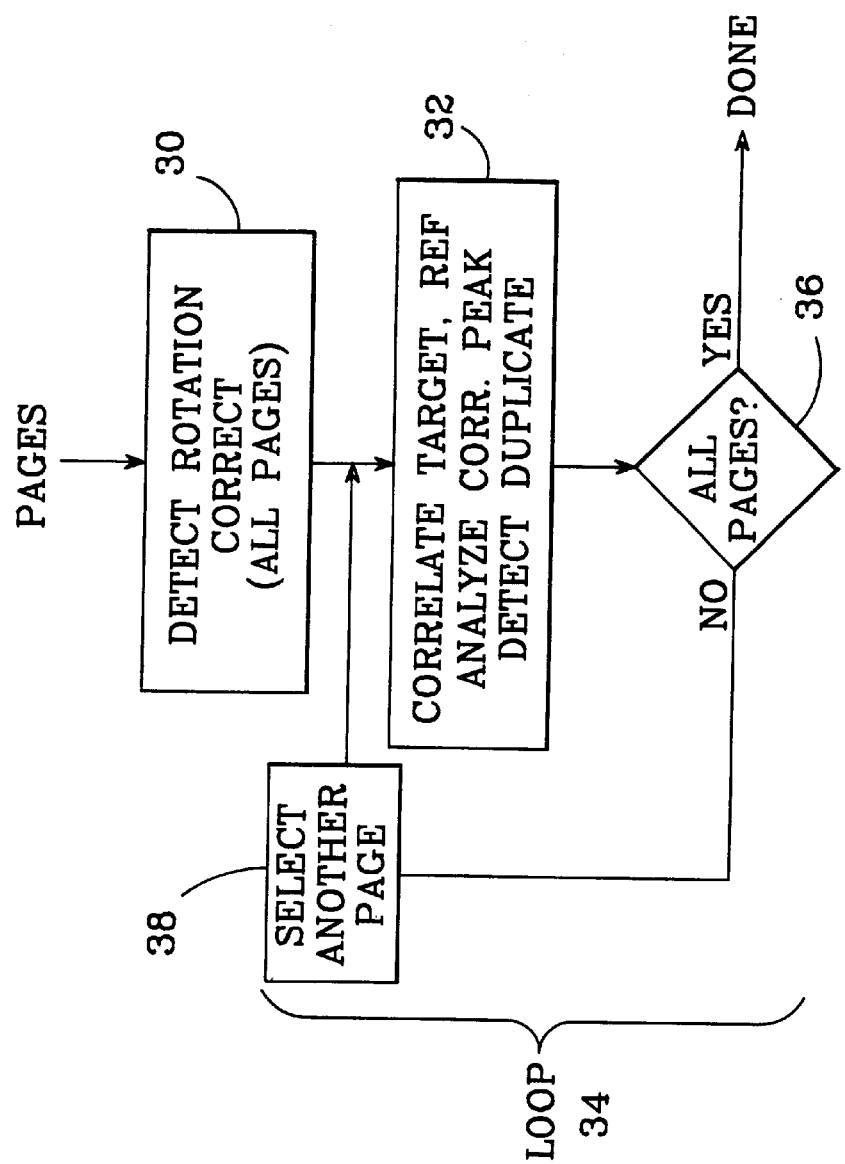
FIG. 2 is a flow chart of the preferred method to implement the invention.

In one embodiment, the invention has two main steps (each including multiple sub-steps), as shown in FIG. 2. First, any rotational misalignment is detected and corrected (main step 30), preferably for all pages of a document; second, a page of the document (a "target page") is correlated with another page (a "reference page") and the resulting correlation image is analyzed (main step 32) to detect duplicate pages. The second step is preferably repeated in multiple iterations in a loop 34, so that each page of the document is compared to all other pages. This can be accomplished by testing to determine whether all pages have been compared (decision box 36) and if not, selecting another page (step 38) and repeating (from step 32) until all pages have been compared. Duplicate pages are identified (in main step 32) by a high correlation peak in the correlation image. The details of these main steps will be discussed in sequence below.

The rotational correction step 30 will be described first. This step 30 is an image processing procedure which can be suitably executed by the data processor 12 under software control. In order to aid in visualization of the operation of this step, it is helpful to graphically illustrate the Fourier transformation of an example page of text, shown in FIG. 3. The figure shows a typical page reproduced at reduced resolution (256×256). Although the text is illegible at this resolution, it is sufficient to permit the invention to operate.

Figure 3:
FIG. 3 depicts an example page of text.

The page shown in FIG. 3 consists of multiple rows of text 40 which suggest "ridges" (the more black printed text lines) and "valleys" (the white interlinear spaces) of image intensity. These ridges and valleys of print intensity possess a strong periodicity typical of text, which is almost invariably arranged in either rows or columns with consistent spacing. Assume that such a page of text is subjected to two-dimensional Fourier transformation, defined by:

$$P_F(k_x, k_y) = \int_{-\infty}^{\infty}\int_{-\infty}^{\infty} f(x, y)e^{-i2\pi k_x}e^{-i2\pi k_y} dx\, dy \qquad (1)$$

Where $P_F(k_x, k_y)$ is a complex intensity function, $k_x$ and $k_y$ (wave numbers) are spatial frequencies in orthogonal directions, x and y are spatial coordinates of the page of text, and f(x,y) is the intensity function of the page. The transformation produces a frequency domain representation of the page of text, which is an image with varying intensities $P_F$ associated with its points, each point representing a specific (x direction, y direction) frequency component of the original page of text.

Although the above equation is given in integral form, appropriate to a continuous mathematical model, in the invention the page image and the resulting Fourier transform image will typically be represented by discrete (pixellated) images, with discrete mathematical techniques applied to compute the two-dimensional Fourier transform. If performed by a digital computer, well know computational techniques such as fast Fourier transform (FFT) techniques can be used. Alternatively, the Fourier transform image can be formed by optical transformation, by a dedicated signal processor, or by other well known methods.

Due to the periodic ridges and valleys (rows of text) of FIG. 3, the Fourier transform image derived from such a page by scanning in the vertical direction will have strong peaks at the frequency of the horizontal rows on the page. For example, if there are 54 horizontal rows of text on the page then a one-dimensional Fourier transform of the page, scanned in the vertical direction, will have large peaks at a frequency of 54 (per page length). In general, the periodicity of rows of text with a cycle of length $\Delta y$ will have a strong power peak at a wave number whose magnitude is $2\pi/\Delta y$ (in radians). Power spectral density below about 10 Hz lacks significance for the method and will be filtered out, as described below in connection with FIG. 7.

In contrast to scanning in the y direction, which produces a distinct spectral power peak at the line periodicity, scanning in the horizontal (x) direction will yield a more dispersed PSD for properly aligned page, due to the varying widths and shapes of the alphanumeric characters which form text. There is no single, recognizably dominant periodicity in the x direction.

Figure 4:
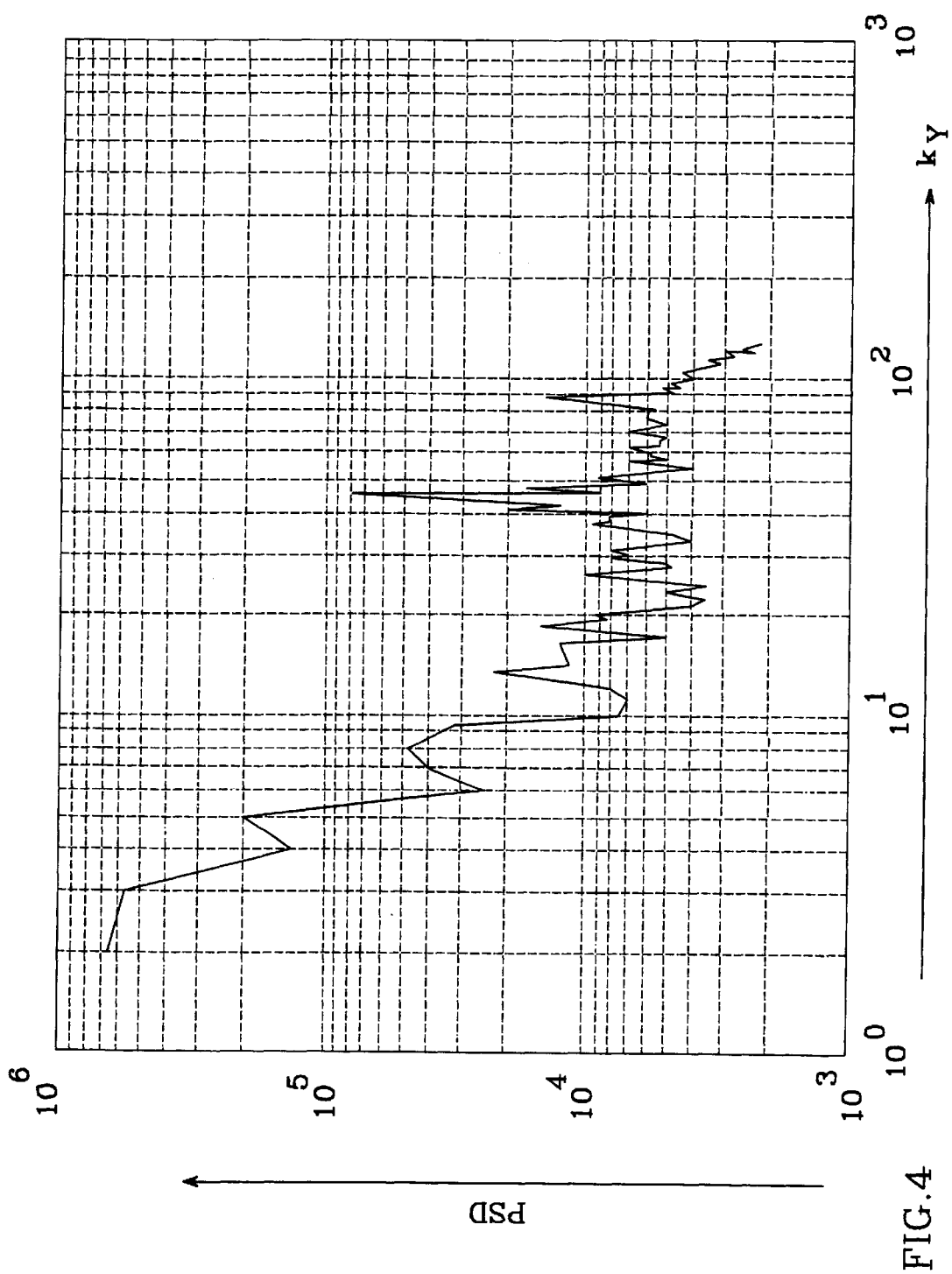
FIG. 4 is a graph of the y component of power spectral density (on the vertical axis) versus frequency (on the horizontal axis) for a Fourier transform of the example page of FIG. 3.

FIG. 4 shows an example of the power spectral density (PSD, the square of the intensity function $P_F$) projected onto the $k_y$ axis for a page that is properly aligned. In the figure the spectral peak due to the rows of text is readily discernible at a wave number of about 45 cycles, which corresponds to the approximate number of rows (45) on the page from which the figure was derived.

FIG. 4 represents only a projection of the PSD image onto the $k_y$ axis. It should be remembered that the actual PSD image is two-dimensional, representing periodicity of the text as scanned in both the x and y directions.

In our example, if the text is perfectly oriented (text rows parallel to the x-axis), the PSD distribution for the averaged text row will exhibit peaks as in FIG. 4, and these peaks will be perfectly aligned along the $K_y$ axis. Multiple peaks will generally be present, corresponding to multiple harmonics and other frequency components. However, if the page is rotated then the line of peaks will be rotated relative to both axes. This results from inherent mathematical properties of the two-dimensional Fourier transform operation. Furthermore, the angle of the line joining the peaks and passing through the origin is precisely the angle e of rotation of the page from the proper alignment (for linear $k_x$, $k_y$ scales).

Figure 5:
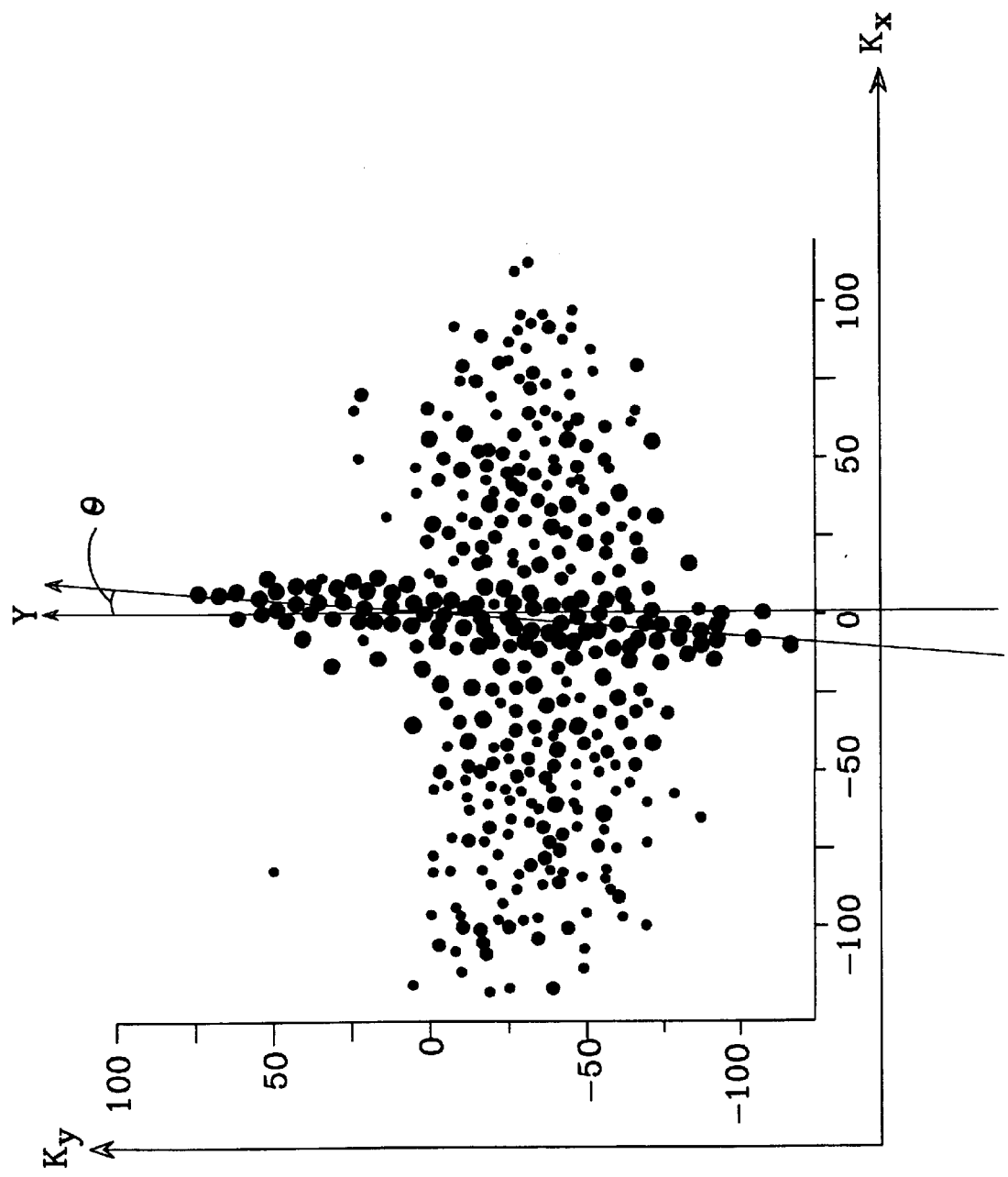
FIG. 5 is a graph of the distribution of power spectral density (shown as darkened points) with respect to x frequency and y frequency on the x and y axes, respectively, for a Fourier transformed example text page which has been rotated by two degrees in the x-y plane.

FIG. 5 shows the two-dimensional PSD image, plotted in two dimension $k_x$ and $k_y$, derived from a page which has been rotated in the x-y plane by two degrees from perfect alignment (lines parallel to x axis). The slight rotation of the PSD peaks is noticeable, and the angle θ is shown. The angle θ of rotation of each text page from proper alignment (as defined above) is found by finding the corresponding angle of rotation of a line passing substantially through the PSD peaks of the Fourier transform image derived from that text page. This is accomplished using statistical linear regression techniques as follows.

Figure 6:
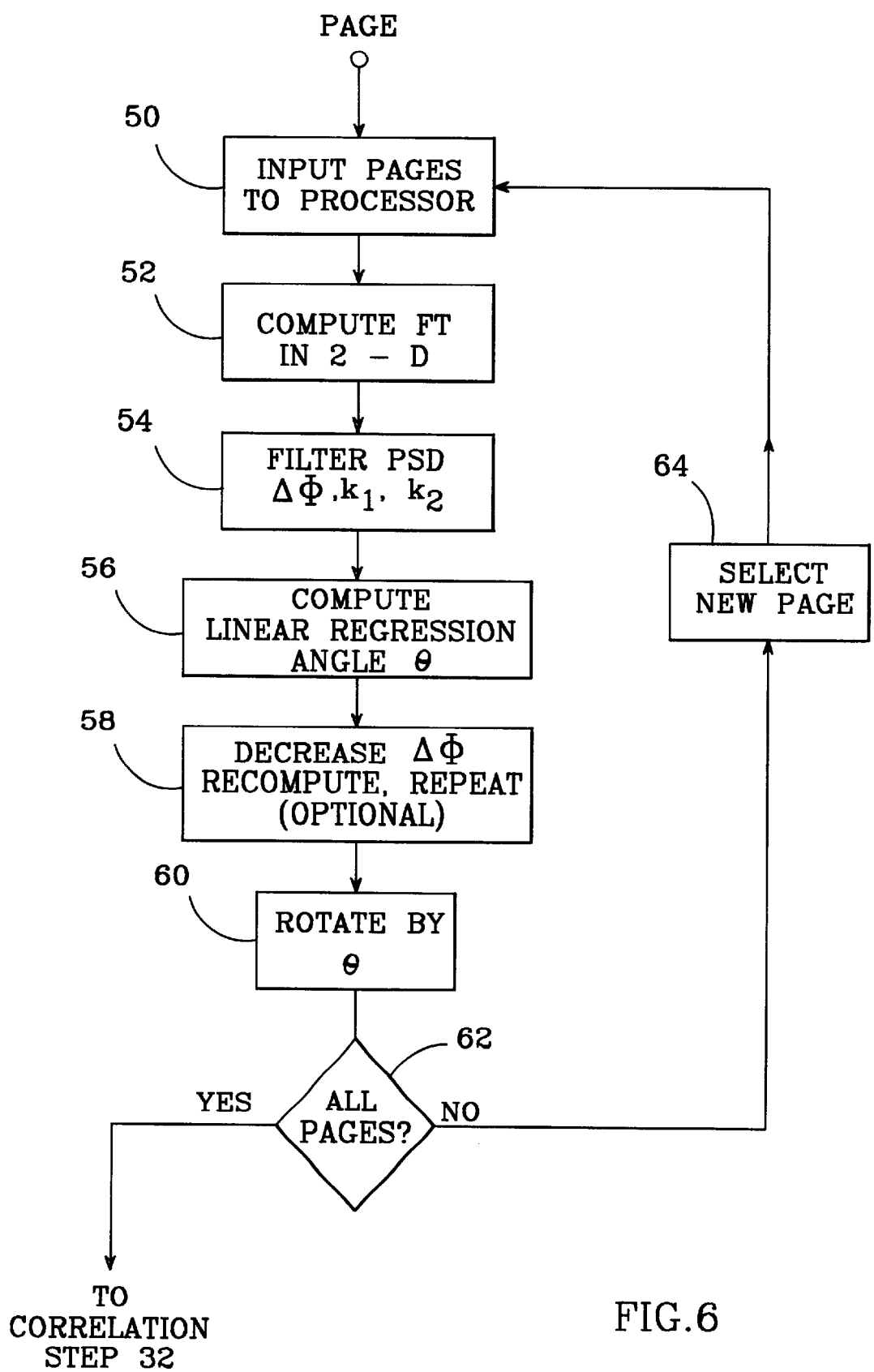
FIG. 6 is a flow chart showing a preferred implementation of the detect and correct rotation step of FIG. 2.

Keeping the above example in mind as an aid to visualization, we can describe the detailed procedure of the rotational alignment step with reference to FIG. 6. First, the pages of text, which include at least one target and one reference page, are input in digital form to the data processor (step 50). Preferably both the reference page and the target page are then two-dimensionally Fourier transformed (step 52), by one of the methods suggested above in connection with FIG. 1 to obtain respective frequency domain images (representations) of the pages. The angle of rotation of each page is then computed by using linear regression techniques (steps 54–58).

Figure 7:
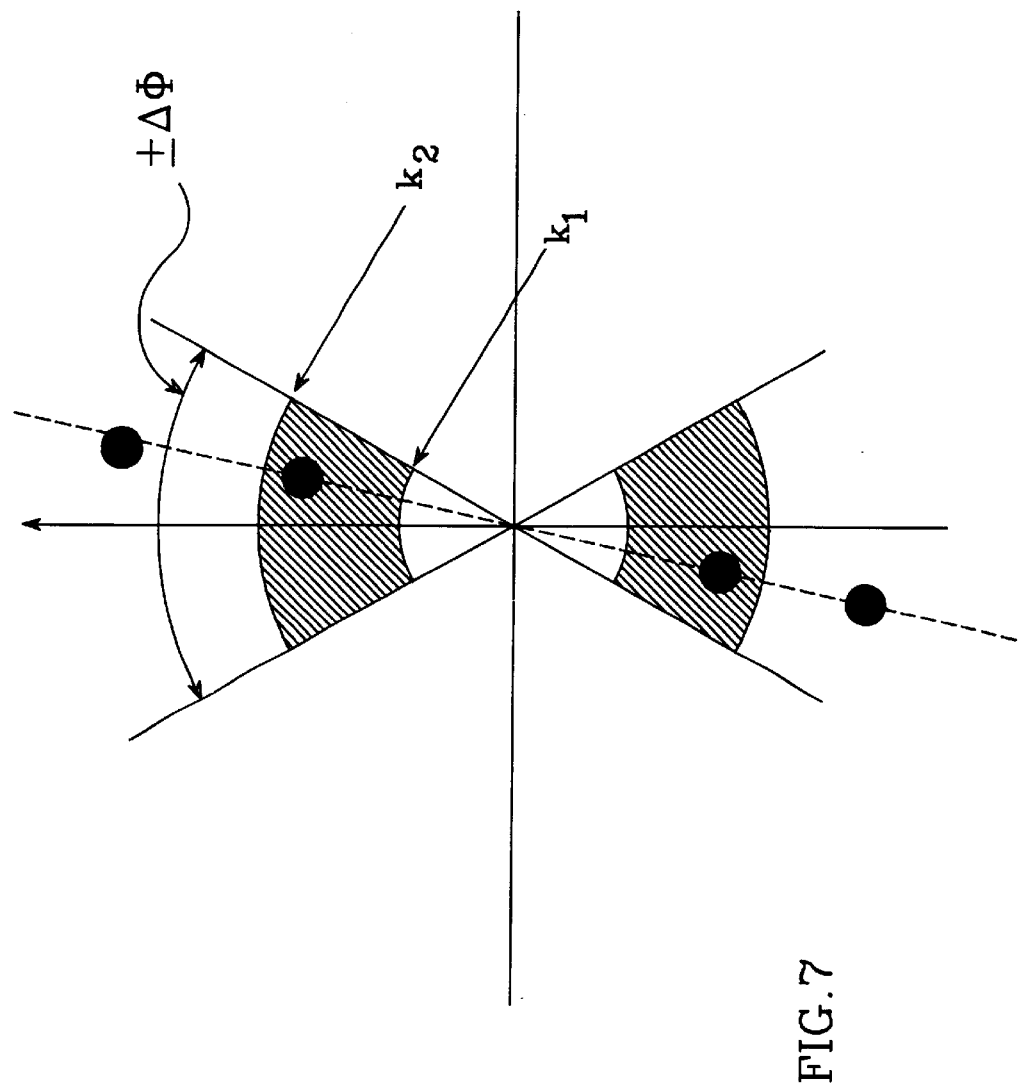
FIG. 7 is a graph of the pass band characteristics of a generalized frequency domain filter, with a transfer function varying according to x and y frequency components in a $K_x$, $K_y$ frequency plane, which can be used to pre-filter the frequency components of a page before linear regression analysis.

As a preliminary part of the linear regression, it is preferable but not absolutely necessary to filter the PSD with a frequency domain filter (step 54), most preferably with an annular and angle limited band-pass filter. The graphic form of a preferred filter is shown in FIG. 7, with angles represented by ΔΦ and the frequency cutoffs represented by $k_1$ and $k_2$. This filtering eliminates a large number of smaller peaks scattered throughout the PSD which would otherwise adversely affect the linear regression operation (described below).

The filter angle and annular frequency cutoffs which are most effective will depend upon the particular font and page characteristics of the text. In a suitable embodiment, an acceptance angle of (+/–)5 degrees and an annular pass band between 66 and 128 (cycles per page) are used. These correspond to a maximum rotation of approximately 5 degrees and fonts approximately between 6 point and 12 point, inclusive. Acceptance angles of less than 5 degrees may be used in some applications, where text is more accurately initially aligned. It has been found that filter angles of greater than 5 degrees perform poorly with text pages.

Returning to FIG. 6, after the PSD is filtered the angle of rotation is computed (step 56) using linear regression techniques. First, the data processor computes several quantities: the mean wave number <k>(a vector with components $k_x$ and $k_y$), the covariance of the x and y wave number components, and the variance of the y wave number component, according to the expressions:

$$\langle \bar{k} \rangle = \frac{\sum_{ij} \bar{k}(i,j) P_F(i,j)}{\sum_{ij} P_F(i,j)} \tag{2a}$$

$$\mathrm{Cov}(x,y) = \tag{2b}$$
$$\langle k_x k_y \rangle - \langle k_x \rangle \langle k_y \rangle = \frac{\sum_{ij}(k_x(i,j)-\langle k_x \rangle)(k_y(i,j)-\langle k_y \rangle)P_F(i,j)}{\sum_{ij} P_F(i,j)}$$

$$\mathrm{Var}(y) = \langle k_y^2 \rangle - \langle k_y \rangle^2 = \frac{\sum_{ij}(k_y(i,j)-\langle k_y \rangle)^2 P_F(i,j)}{\sum_{ij} P_F(i,j)} \tag{2c}$$

Where k(i,j) is the wave number vector whose components are the coordinates in $k_x$, $k_y$ on the PSD image, i and j are indices identifying particular pixels on the discrete PSD image; $P_F(i,j)$ is the local value of PSD intensity at the point i,j; and the summation is over all of the pixels of the PSD image (or at least all of the pixels within the filter pass band).

From these quantities the angle of rotation θ is computed, according to:

$$\theta = \arctan\left(\frac{\mathrm{Cov}(x,y)}{\mathrm{Var}(y)}\right) \tag{3}$$

It is most preferable to iterate this linear regression multiple times with different filters to provide stable convergence to within ¼ degree. This can be accomplished by progressively decreasing the angle of the filter ring in decrements (optional step 58) and using the previously computed value of the angle of rotation θ as the new starting point for the linear regression of the next iteration, repeating step 58 a predetermined number of times.

After the proper angle of rotation is computed, the imaged page is rotated (step 60) by data processor 12 through that angle (with opposite sign) to correctly align the imaged page with the x and y axes, using standard well known mathematical expressions for rotation of a plane figure, together with well known image processing techniques for pixellated images.

The above procedure for rotationally aligning a page should preferably be repeated at least twice, once for a target page and once for a reference page; it is desirable in most applications to apply the rotational correction procedure to all of the text pages to be searched, aligning them to a common defined set of axes. Alternatively, a first page could be analyzed to determine a preferred axis which then provides the definition of axes; a second page could then be rotationally corrected to the axes defined by the first page. This would yield equivalent results.

In an application where it is desired to correct a multiplicity of pages, the method can be reiterated an indefinite number of times by testing (decision box 62) to determine whether all pages have been corrected, and if not, selecting a new page (step 64) and repeating by returning to the input page step 50, as shown, in a loop until all pages have been corrected.

In some applications the method of rotationally correcting images, as described above, will be sufficient in itself to produce useful results: rotationally corrected documents. Such rotationally corrected documents can be used in angle-sensitive processes such as optical character recognition (OCR).

In one embodiment the method proceeds with correlation (step 32 in FIG. 2) of the corrected pages. As diagramed in FIG. 8, rotationally aligned pages are selected (step 70) pair-wise, each pair including a target and a reference page. The two pages are then cross-correlated (step 72) with one another. This operation is most efficiently performed by an optical correlator, as discussed below.

The rotational alignment and the cross-correlation stages of the invention cooperate to produce text matching, because cross-correlation operations do not produce accurate correlation peaks from rotationally mis-aligned images.

After cross-correlation, the output image is analyzed (step 74) for the presence of a correlation intensity peak. The presence of such a peak indicates a text match between the reference page and the target page. It is an advantage of the invention that the pages need not be perfectly registered in position; they may be slightly shifted upwards or sideways and an adequate correlation peak will be detected (although at a slightly shifted location on the correlation image). The data processor 12 searches the correlation image matrix to find the peak correlation. In practice it has been found that a correlation value of approximately 0.6 is sufficient to identify duplicate text pages, where 1.0 is perfect correlation and 0.0 is perfectly uncorrelated random noise. The actual threshold values to be used in a particular application may be varied depending on the statistical confidence required of the result.

Figure 8:
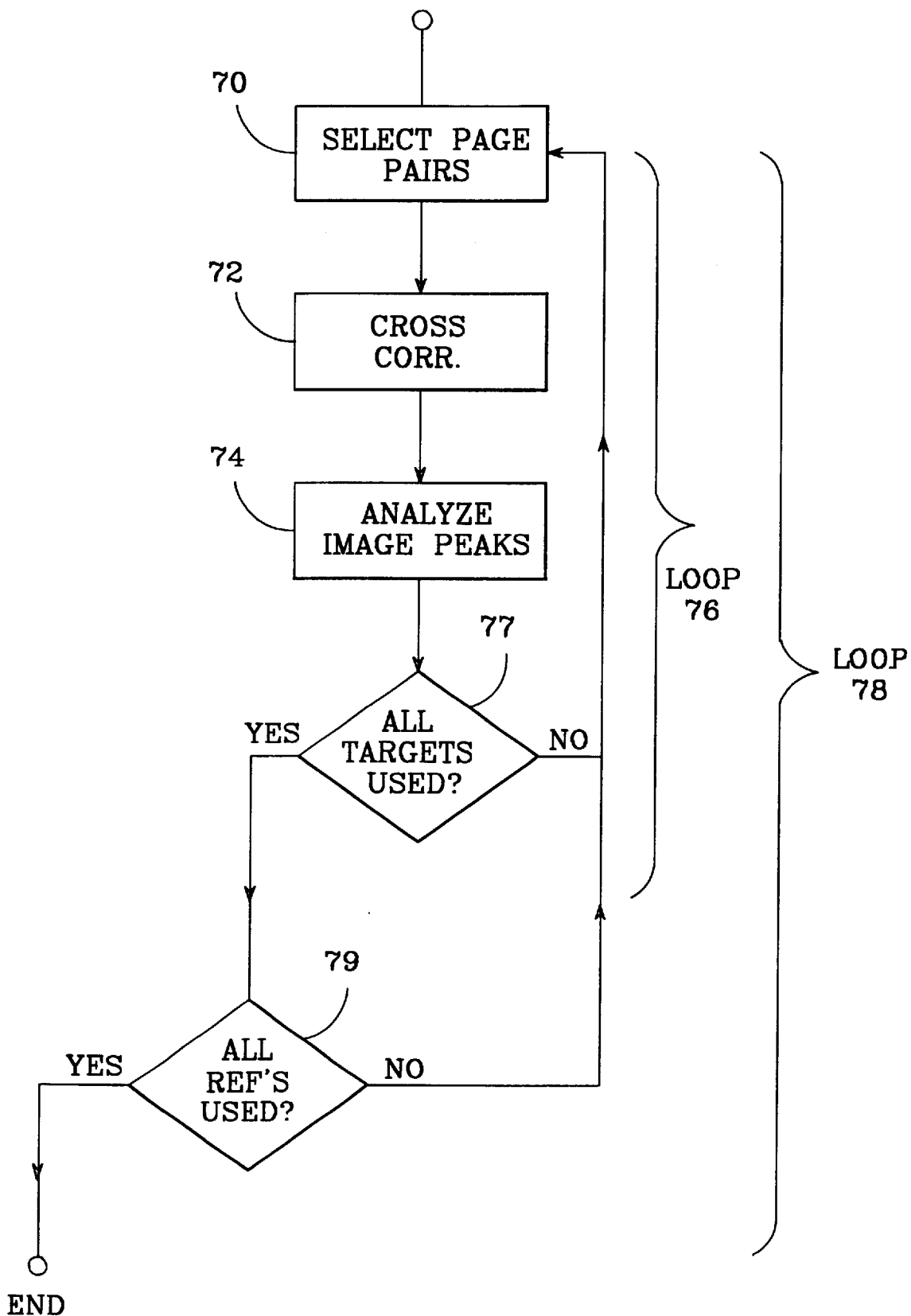
FIG. 8 is a flow chart showing the details of the correlation step of FIG. 2.

In some applications it may be desired to compare a reference page to every page in a database. This can be accomplished by executing a search loop 76, by testing to detect whether all target pages have been compared (decision box 77) and, if not, looping back to the select page step 70 as shown in FIG. 8. If it is further desired to compare every page in a database with every other page, the search loop 76 can be nested within another search loop 78 as shown, by testing whether all reference pages have been compared (decision box 79) and, if not, looping back to step 70, with the result that every page is used once as a reference page and compared sequentially with every other page. Many variations of the searching strategy are possible, and are also within the scope of the invention, the method of rotationally aligning and comparing images as claimed.

It is an advantage of the invention that the Fourier transform of any image, once calculated in the rotational alignment stage, can be saved either in RAM 13 or in the database 16 for use in the correlation stage—it need not be recomputed. The Fourier transform image can be rotated directly in the frequency domain, then used as input to the filter SLM input of the optical correlator (as discussed below) or in digital correlation in the Fourier transform domain. Rotating the image in the transform domain is equivalent to rotating it in the spatial domain, then transforming, as is well known. This reuse of the Fourier transform yields very significant savings in computational time.

Image correlation by optical correlators is known. See for example, U.S. Pat. No. 5,311,359 to Lucas et al., and U.S. Pat. No. 5,148,496 to Anderson. Both of these patents disclose compact optical correlators capable of performing cross-correlation of digitized, pixellated images. The principles of operation of these devices are discussed in those patents. Their operation may be summarized as follows: An digital electronic input image is written to an input spatial light modulator (SLM), pixel by pixel. That SLM, internal to the optical correlator, modulates a coherent light beam. The modulated beam is optically Fourier transformed and the transform focused on a second or "filter" SLM. The filter SLM is electronically modulated, pixel by pixel, with another image which is the (usually digitally obtained) Fourier transform of a comparison image. The twice-modulated beam is then inversely Fourier transformed and the resulting image is read by a photodetector array, to provide an output image which is the cross-correlation of the input image and the comparison image.

To use an optical correlator in the present invention, one of the target and reference images is output, under control of data processor 12, to the input image input 80 of optical correlator 18 (referring to FIG. 1). The digitally obtained two-dimensional Fourier transform of the other image is similarly written to a filter input 82 of the optical correlator. A correlator output 84 is then read by the data processor 12.

The cross-correlation operation could be performed by alternative methods, including digital computation in either a spatial or frequency domain using the data processor, by well known methods. Such alternatives and their equivalents are also within the intended scope of the invention. However, use of an optical correlator will typically result in much faster correlation, by several orders of magnitude.

It will also be recognized that certain types of imagery other than text can be found with a strong periodic component in a preferred direction. For example, aerial photographs of periodic ocean wave patterns, or electrophoretically separated DNA sequences may by amenable to analysis by the invention. Such images are also well suited to analysis by rotational alignment and Fourier transform correlation, according to the invention. Alternatively, an image could be marked during image acquisition with a highly recognizable previously defined periodic pattern, such as a cross hatching calibrated to known directions. The resulting peaks in the acquired image could be used to rotationally align the image for correlation. Accordingly, the invention is not limited to use with text, but may be used with any image or data.

While several illustrative embodiments of the invention have been shown and described, numerous variations and alternate embodiments will occur to those skilled in the art. For example, the "reference page" might not be a complete page of text, but could be a word or phrase. The invention would then search a collection of target pages for the word or phrase. Although the invention is illustrated above in the context of portrait formatted pages, the method could be applied to documents in landscape format by rotating the axes. The invention will operate successfully when applied to single-bit, binary images (arrays of pixels each set to either 1 or 0 for black or white) with adequate results; but it will produce superior correlation signals (at some cost in speed) with multi-level resolution of intensity. Images with multi-level intensity information can be converted to binary intensity representations by comparing each pixel's intensity to a threshold value ("thresholding"). The data processor can include parallel processing with dedicated signal processing devices which perform Fourier transformation and/or the linear regression analysis. Such variations and alternate embodiments are contemplated, and can be made without departing from the spirit and scope of the invention as defined in the appended claims.

We claim:

1. A method of determining the degree of similarity between imaged pages, comprising the steps of:

providing a reference and a target page, both in image form;

rotationally aligning at least one of said target and reference pages by (a) identifying periodic components in said at least one page by performing a two dimensional Fourier transform of said page to obtain a power spectral density distribution (b) finding a page axis which corresponds in orientation with the periodic components in said at least one page, by performing a linear regression analysis of said power spectral density distribution to compute an angle, relative to a reference axis, of a page axis which best fits said power spectral density distribution of said page, and (c) rotating said at least one page through said angle to align said at least one page with said reference axis;

cross-correlating in two dimensions said target and reference pages to produce a cross-correlation image; and analyzing said cross-correlation image to determine the presence of a correlation peak which indicates similarity between said reference and said target pages.

2. The method of claim 1, wherein said step of finding a page axis further comprises:

modifying said power spectral density distribution by a filter function in the frequency domain prior to performing said linear regression analysis.

3. The method of claim 2, wherein said target and reference pages comprise text.

4. The method of claim 2, wherein said step of modifying said power spectral density distribution comprises filtering said power spectral density distribution with an angular wedge filter to attenuate power spectral density signals outside of an angular wedge.

5. The method of claim 4, wherein said step of modifying said power spectral density distribution further comprises filtering said power spectral density distribution with an annular frequency filter.

6. The method of claim 1, wherein said step of cross-correlating target and reference pages comprises the steps of:

inputting said target and said reference pages into an optical correlator which optically computes the cross-correlation of said pages, and reading the output of said optical correlator to obtain the cross-correlation image.

7. The method of claim 1, wherein said linear regression analysis comprises calculating a variance and a covariance of said power spectral density distribution, and calculating said angle as the inverse tangent of the ratio of said covariance to said variance.

8. A method of rotationally aligning a skewed image to a defined reference axis, comprising the steps of:

providing a page, in a digitized image form; and rotationally aligning said page by (a) identifying periodic components in said page by performing a two dimensional Fourier transform of said page to obtain a power spectral density distribution (b) finding a page axis which best corresponds in orientation with the periodic components in said page, by performing a linear regression analysis of said power spectral density distribution to compute an angle, relative to the reference axis, of a page axis which best fits said power spectral density distribution of said page, and (c) rotating said page through said angle to align said page with the reference axis.

9. The method of claim 8, wherein said page comprises text.

10. The method of claim 8, wherein said step of finding a page axis further comprises:

modifying said power spectral density distribution by a filter function in the frequency domain, prior to said step of performing a linear regression analysis.

11. The method of claim 10, wherein said step of modifying said power spectral density distribution comprises filtering said power spectral density distribution with an angular wedge filter to attenuate power spectral density signals outside of an angular wedge.

12. The method of claim 11, wherein said step of modifying said power spectral density distribution further comprises filtering said power spectral density distribution with an annular frequency filter.

13. The method of claim 8, wherein said linear regression analysis comprises calculating a variance and a covariance of said power spectral density distribution, and calculating said angle as the inverse tangent of the ratio of said covariance to said variance.

* * * * *